Jan. 12, 1943.  A. B. CLUNAN  2,307,736

TEAR TAPE

Filed April 9, 1941

Inventor
Albert B. Clunan

By

Attorney

Patented Jan. 12, 1943

2,307,736

UNITED STATES PATENT OFFICE 2,307,736

TEAR TAPE

Albert B. Clunan, Akron, Ohio, assignor to Wingfoot Corporation, Wilmington, Del., a corporation of Delaware Application April 9, 1941, Serial No. 387,621

2 Claims. (Cl. 229—51)

This invention relates to a new type of tear tape designed particularly for use with rubber hydrochloride film although it may be used with other packaging materials, such as paper "Cellophane," etc. The tear tape is a rubber hydrochloride ribbon which has been strengthened by stretching and which is preferably made by plying up several plies of stretched ribbon and uniting the plies by heat and pressure.

There are various types of tear tapes on the market, but none of these is moistureproof. When placed inside a wrapper with an end protruding through the seal these prior tear tapes serve as wicks to transfer moisture through the wrapper. As contrasted with these the rubber hydrochloride tear tape is thoroughly moistureproof and will not transmit moisture vapor and moreover when used with rubber hydrochloride film, the film and tear tape may be welded together to form a firm moistureproof bond.

Figure 1:
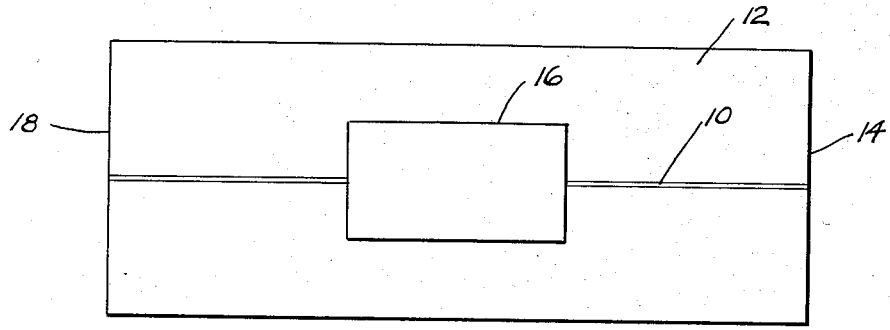
Figure 2:
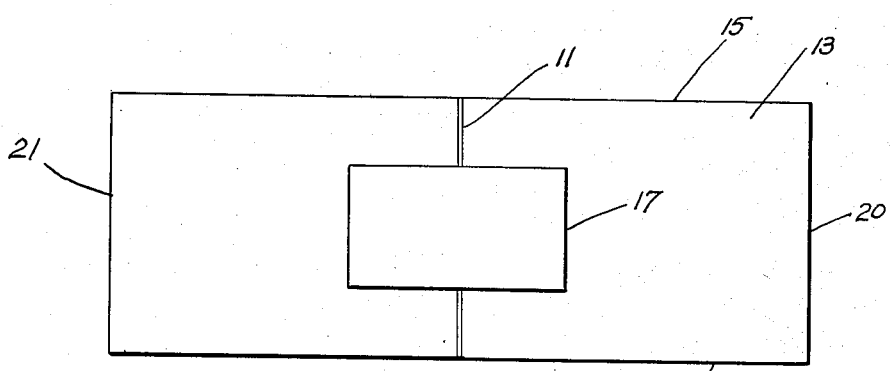
Figure 3:
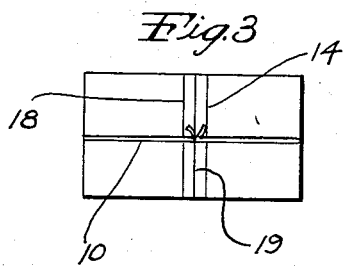
Figure 4:
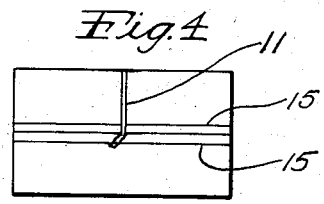

There are several ways of using the tear tape, two of which are shown in the accompanying drawing. Fig. 1 shows a wrapper with the tear tape and an object to be wrapped. Fig. 2 similarly shows a wrapper and an object to be wrapped with a tear tape arranged in a different way. Fig. 3 is an end view of the package formed from the object and wrapper shown in Fig. 1, and Fig. 4 is an end view of the package formed from the object and wrapper shown in Fig. 2.

Figs. 1 and 2 show two different arrangements for the tear tape 10 and 11. In Fig. 1 the tear tape runs lengthwise of the wrapper 12, and in Fig. 2 it runs across the wrapper 13. The wrappers 12 and 13 are of rubber hydrochloride film, and they are preferably cut from large rolls of the film. The wrapper 12 in Fig. 1 has been cut from a roll of the film at the narrow edge 14, and the wrapper 13 has been cut from a roll at the side edge 15. As the wrapper is unrolled in each instance, the tear tape is simultaneously unrolled from the same or a separate roll, and the wrapper and tape are cut off simultaneously.

Two different types of package are formed from the different arrangements of object, tear tape and wrapper shown in Figs. 1 and 2 although in each instance the object and wrapper are the same size. The difference is due to the fact that the tear tape is arranged in a different way in each case. The package formed from the arrangement shown in Fig. 1 is a package in which the tear tape completely encircles the object. In the package formed from the arrangement shown in Fig. 2, the tear tape goes but half way around the package. The package made from Fig. 1 is illustrated in Fig. 3, and the package made from Fig. 2 is illustrated in Fig. 4.

The objects 16 and 17 shown in Figs. 1 and 2 are rectangular boxes of the same dimensions. In wrapping the object shown in Fig. 1, the edges 14 and 18 of the wrapper 12 are brought together and united by a heat seal a short distance from each edge. The edges 14 and 18 may then be folded back away from the heat-seal 19 as shown in Fig. 3. It will be noted that the tear tape 10 completely encircles the object underneath the wrapper 12 and both ends of the tear tape extend through the heat-seal. The wrapper and tear-tape are united by a heat-seal. The ends of the tape are not united to the wrapper. To open the object either or both ends are grasped and by using the tear tape to cut the wrapper completely around the object the wrapper may be cut into two parts and thus removed from the object.

The package formed from the arrangement shown in Fig. 2 is quite different, because the tear tape 11 will extend but half of the way around the package. In wrapping the object 11 the edges 20 and 21 will be brought together and united in any desired way. The object 17 is then encircled by a tube of the wrapping material. To complete the package the ends must be sealed together. In order to make the tear tape available, at least one end of it must extend through the wrapper so that it may be grasped from outside of the wrapper. Ordinarily the other end will also extend through the wrapper, but this is not necessary because if one end extends through the wrapper, and the other end is sealed to the wrapper, it will be possible by pulling the free end away from the package to tear or cut the wrapper at least to the point where the tear tape is sealed to it.

In order to make the end of the tear tape 11 extend through the seam, two fingers may be inserted in the end of the tube formed by bringing together the edges 20 and 21 of the wrapper, and by spreading these fingers, the opposite edges 15 of the tube are brought together. These are united by a heat-seal at a short distance from the edge 15. This heat-seal extends from one side of the tube to the other and makes an air-tight seal. The length of the heat-seal is greater than the width of the package and its ends may be turned down along the sides of the package, and the end of the package will then appear as shown in Fig. 4. The end of the tear tape 11 extends through the heat-seal and is readily available for use. The wrapper and tear tape are heat-sealed together and there is no opportunity for air or moisture to enter the package around the tear tape or through it.

Both ends of the package may be formed in the same way and then an end of the tear tape will be available at each end of the package.

In forming a heat-seal, such as that shown in Fig. 3 or Fig. 4, the contacting surfaces of rubber hydrochloride are softened and welded together. The rubber hydrochloride of the tear tape welds perfectly with the rubber hydrochloride of the wrapper, and the two unite to form a perfectly homogeneous seam. The seam is airtight and it is composed wholly of rubber hydrochloride. No moisture can enter it. With a tear tape of paper or string or the like extending through the seal, the tear tape would serve as a wick for the transfer of moisture through the rubber hydrochloride enclosure, either transferring moisture from the atmosphere to the package or from the package to the atmosphere. Using a rubber hydrochloride tear tape there is no such transfer of moisture through the rubber hydrochloride enclosure.

The rubber hydrochloride film used for the wrapper is film of the type sold on the market as "Pliofilm." It is formed by casting a rubber hydrochloride cement on a smooth surface. This film does not have any great tensile strength and when heated will readily stretch. By stretching the film longitudinally about 100% or more the tensile strength is materially improved in the direction of stretch. The film may, for example, be stretched 80% or several hundred per cent.

The tear tape of this invention is advantageously prepared by stretching and uniting several plies of ordinary film. The film may or may not be plasticized and may or may not contain a photochemical inhibitor. Film about .001 of an inch thick may be used. For example, three plies of such film of the same width may be individually heated by passing over heated drums, and then by withdrawing the heated films from the drums at a speed at least about twice the surface speed of the drums and pressing the three plies together as they leave the drums, a laminated sheet of greatly improved tensile strength is obtained. This sheet may be cut longitudinally into narrow widths to form the tear tape which has greater longitudinal tensile strength than lateral. The stretching and laminating of rubber hydrochloride film to produce a product of increased tensile strength is described in Minich British Patent No. 497,788. It is not necessary that several plies of thinner film be united to make the tear tape, as a thick film may be stretched to give a tape of the desired thickness and strength. However, commercially the production of the tape by uniting several plies of thin film will be more advantageous than forming the tape from a single ply of film. As an alternate method the tear tape may be made by stretching a rubber hydrochloride film and twisting or rolling it while heated and pressing contacting surfaces together to make them adhere, and thus produce a thread-like structure which has greater longitudinal tensile strength than lateral.

The wrapper may consist of rubber hydrochloride. It may be paper or other wrapping material coated on the interior with rubber hydrochloride. It may be a composite wrap comprising an inner enclosure of rubber hydrochloride film and an outer wrap of paper. In the latter case the tear tape may extend through only the rubber hydrochloride enclosure or it may extend through both the rubber hydrochloride enclosure and the outer paper wrap. If the tear tape is used with other materials than rubber hydrochloride it may or may not be coalesced thereto.

What I claim is:

1. In a package the wrapper of which consists of a ply, the inner surface of which is rubber hydrochloride, a tear tape of rubber hydrochloride film which is permanently elongated and, therefore, has a longitudinal tensile strength greater than its lateral tensile strength, at least one end of the tear tape protruding through a seam formed by coalescence of contacting rubber hydrochloride surfaces, the rubber hydrochloride surface of the tear tape being coalesced with the contacting rubber hydrochloride surface of the wrapper.

2. In a package with a composite wrapper, the inner ply of which is a rubber hydrochloride film, a tear tape of rubber hydrochloride which is permanently elongated and, therefore, has a longitudinal tensile strength which is greater than its lateral tensile strength, at least one end of the tear tape extending through the composite wrapper, the rubber hydrochloride surface of the tear tape being coalesced to the contacting rubber hydrochloride surface of the wrapper where the tear tape extends through the wrapper.

ALBERT B. CLUNAN.